United States Patent

Wellman et al.

[11] Patent Number: 5,983,727
[45] Date of Patent: Nov. 16, 1999

[54] SYSTEM GENERATING A PRESSURE PROFILE ACROSS A PRESSURE SENSITIVE MEMBRANE

[75] Inventors: Parris S. Wellman, Somerville, Mass.; Jae S. Son, El Segundo, Calif.; Robert D. Howe, Cambridge, Mass.

[73] Assignee: Pressure Profile Systems, Somerville, Mass.

[21] Appl. No.: 08/914,730

[22] Filed: Aug. 19, 1997

[51] Int. Cl.⁶ .................................. G01L 9/00; G01L 7/08
[52] U.S. Cl. .............................. 73/724; 73/727; 73/705; 73/723
[58] Field of Search .............................. 73/723, 724, 726, 73/727, 705, 701; 338/4, 42; 361/283.4; 250/231.19, 227.14

[56] References Cited

U.S. PATENT DOCUMENTS

| | | | |
|---|---|---|---|
| 210,179 | 11/1878 | Blake | 73/715 |
| 3,328,653 | 6/1967 | Wolf | 73/724 |
| 4,977,480 | 12/1990 | Nishihara | 73/724 X |
| 5,184,515 | 2/1993 | Terry et al. | 73/727 |
| 5,309,767 | 5/1994 | Parmar et al. | 73/705 |
| 5,357,808 | 10/1994 | Fung et al. | 73/721 |
| 5,450,754 | 9/1995 | Biebl et al. | 73/724 |

*Primary Examiner*—Joseph L. Felber
*Attorney, Agent, or Firm*—Wolf, Greenfield & Sacks, P.C.

[57] ABSTRACT

An improved fluid pressure sensor/sensor array is shown to provide high resolution, sensitivity which can be easily controlled based on anticipated or detected pressure range, and reliable pressure measurements with easy installation and low fabrication cost. A fluid pressure sensor is provided having a substantially incompressible mounting structure with a cavity formed therein. An elastic membrane is attached to said mounting structure and across said cavity, separating the cavity from the fluid to be measured. At least one non-contact transducer is attached to the mounting structure in the cavity to detect deflection at a selected plurality of regions on the membrane. The sensitivity and pressure range of the sensor can be chosen by preselecting the elasticity of the membrane, stretching the membrane across the cavity under a preselected tension, maintaining a predetermined reference pressure in the cavity, and/or actively controlling the membrane tension. For a pressure sensor array, there are at least two fluid pressure sensors, where at least one sensor is of the type described herein. A sensor array can also be formed by multiple cavities within a single mounting structure.

54 Claims, 3 Drawing Sheets

SYSTEM GENERATING A PRESSURE PROFILE ACROSS A PRESSURE SENSITIVE MEMBRANE

FIELD OF THE INVENTION

This invention relates to pressure profile sensors and sensor arrays and more specifically to such sensors having non-contact sensing elements to detect pressure at a plurality of areas on a membrane, to methods of pressure profile sensing utilizing such sensor/arrays, and to methods for the fabrication of such non-contact sensors/arrays.

BACKGROUND OF THE INVENTION

Pressure sensors can be utilized to measure the spatial distribution of pressure across a surface due to an environment of fluid or due to contact with the surface of an object. While contact pressure sensors target pressures of approximately $10^4$ Pascals (Pa), many fluid pressure sensing applications target pressures from 1 to 1000 Pa but also require sensitivities of approximately 1 Pa or less. Uses for such fluid pressure profiles include determining fluid dynamic pressure distribution on surfaces to optimize vehicle design, measuring the viscoelastic properties of a fluid in a rotating cone rheometer, and detecting turbulent flow in an enclosed conduit to optimize flow rate. In these high resolution applications, fluid pressure sensors must be sensitive to small differences in pressure over an area, reliable while withstanding high pressure contact during installation and cleaning, and inexpensive to fabricate.

Sensors for pressure profiles can be constructed by placing multiple individual sensors adjacent to each other, where each has a separate membrane. U.S. Pat. No. 5,225,959 issued Jul. 6, 1993, provides an example of a multiple diaphragm contact sensor array. Besides using contact transducers, sensor arrays of this type also have certain disadvantages including (a) spacing is increased between transducers and resolution and sensitivity is decreased since each diaphragm has only one transducer and (b) installation of numerous individual sensors can be difficult to align and to clean. An example of a multiple element, contact sensor with a single diaphragm is shown in U.S. Pat. No. 5,184,515 issued Feb. 9, 1993. However, the sensing elements are piezoresistors disposed within the diaphragm itself. This type of sensor is more susceptible to damage due to contact during installation and cleaning, more susceptible to thermal variations, and more complex and expensive to fabricate than non-contact sensing methods since the piezoresistors are embedded in the membrane.

A need therefore exists for an improved fluid pressure sensor/sensor array which provides high resolution, sensitivity which can be easily controlled based on anticipated or detected pressure range, and reliable pressure measurements with easy installation and low fabrication cost.

SUMMARY OF THE INVENTION

In accordance with the above, this invention provides a fluid pressure sensor which includes a substantially incompressible mounting structure having a cavity formed therein. An elastic membrane is attached across the cavity and separates the cavity from the fluid to be measured. Non-contact transducers are attached to the mounting structure in the cavity and detect deflection at a selected plurality of regions on the membrane. The most preferred embodiment of the invention utilizes multiple transducers, each detecting deflection at a selected region on the membrane.

For preferred embodiments, the membrane can deflect in directions both into and out of the cavity or toward and away from the applied reference pressure, thus, allowing the pressure sensor to detect pressures both greater than and less than the reference pressure in the cavity.

Each transducer preferably provides a substantially independent pressure measurement which can be achieved by spacing the transducers sufficiently to minimize interaction. The transducers may be mounted in various configurations, but a preferred embodiment of the invention arranges the transducers in the cavity such that the spacing is uniform between the cavity sides and each of the regions at which deflection is detected on the membrane.

The transducers can be shielded from the outside electrical, mechanical, and/or chemical environment by attaching a shield or ground plane to the external side of the mounting structure and/or the external side of the membrane.

The mounting structure may be formed from a material that is flexible but substantially incompressible, and the depth of the cavity may be preselected to allow deflection into the cavity without premature bottoming of the membrane when the sensor is subjected to its maximum range of pressure and the mounting structure is flexed to its target curvature.

In accordance with one embodiment of the invention, the mounting structure comprises a substantially incompressible spacer mounted on a substantially incompressible substrate, the spacer having sides extending from the substrate which define the cavity. The transducers can be mounted on the substrate or to the spacer.

A further embodiment of the invention attaches the membrane to the mounting structure with an adhesive having substantially incompressible beads embedded therein. An alternative embodiment may attach the membrane to the substrate with an adhesive having embedded, substantially incompressible beads which function as the spacer.

The sensitivity of the membrane can be chosen by preselecting the elasticity of the membrane, stretching the membrane across the cavity under preselected tension, controlling the membrane tension, and/or maintaining a predetermined reference pressure in the cavity, for example atmospheric pressure. A vent opening to the cavity may be utilized to measure and/or control the reference pressure. These embodiments can also include a mechanism to control the deflection of the membrane to prevent membrane overload, thus increasing the sensor pressure range. The control mechanism can vary the reference pressure to resist membrane deflection, vary the tension of the membrane, or can control deflection for a given fluid pressure in other ways. The membrane control device or method extends the operational range of the sensor while retaining high sensitivity at target operational pressures.

For a preferred embodiment of the invention, at least one (and preferably all) of the transducers is a capacitor. The mounting structure may include a printed wiring board with connection traces and the capacitor may include a sensing plate. A conductive material may coat the interior surface of the membrane uniformly or in a specific pattern. The cavity contains a fluid, which could be a substantial vacuum, to provide a predetermined dielectric constant.

Alternatively, at least one of the transducers includes at least one radiation emitter and at least one radiation receiver. At least one of the radiation emitters/receivers may be a light source/optical sensor or an ultrasonic pulse emitter/ultrasonic pulse sensor.

For a sensor array, there are at least two fluid pressure sensors, where at least one sensor is a pressure profile, non-contact, membrane sensor of the type described above. A sensor array can also be formed by multiple cavities in a single mounting structure. A membrane is attached to the mounting structure across the cavities. At least one non-contact transducer is mounted in each cavity to detect deflection at a selected plurality of regions of the membrane in each cavity. Preferably, a plurality of transducers are mounted in each cavity. The cavities can be interconnected with a vent opening.

To detect the pressure of a fluid, a known reference pressure would be provided on one side of a component that undergoes local displacement in response to a corresponding local pressure differential, such as an elastic membrane. The other side of the membrane would be exposed to the fluid pressure being detected. At least one non-contact transducer measures local displacements at selected regions on the displacement component resulting from the difference between the reference pressure and the external fluid pressure and converts these measurements into a signal indicative of the pressure measurement. A controller reacting to input from the transducers may be utilized to affect displacement component sensitivity and sensor pressure range.

For a preferred embodiment, a pressure sensor is fabricated by the steps of:

(a) providing a mounting structure having a cavity therein;

(b) mounting a plurality of non-contact transducers in the cavity; and (c) attaching a membrane across the cavity.

The membrane is preferably stretched across the cavity at a preselected tension during step (c). A reference pressure may be provided to the cavity by sealing the cavity at a predetermined pressure or by creating a vent opening to connect the cavity to a reference pressure source. Sensing pads and drive traces may be etched into a conductive metal coating on the inner surfaces of the mounting structure and the membrane. A shield may be attached to the external surfaces of the mounting structure and/or the membrane. Step (c) may include using an adhesive with embedded, substantially incompressible beads to attach the membrane to the mounting structure. In one aspect, step (a) includes a step of mounting a spacer on the mounting structure, the spacer forming the cavity by having sides extending from the mounting structure. This step may be performed by removing a cut out from the spacer layer before attaching the spacer to the mounting structure, the cut out forming the cavity alone or the cavity and a vent line. Step (b) may be performed before the step of mounting the spacer.

The foregoing and other objects, features and advantages of the invention will be apparent from the following more particular description of preferred embodiments of the invention as illustrated in the accompanying drawings.

IN THE DRAWINGS

DETAILED DESCRIPTION

The present invention simplifies sensor construction and increases sensor sensitivity and resolution by placing non-contact transducers on a single mounting structure to detect multiple areas of deflection on a single membrane. Such a pressure sensor may be placed adjacent to similar sensors or other pressure sensors known in the art to expand the sensing area while achieving high resolution in selected areas.

Figure 1:
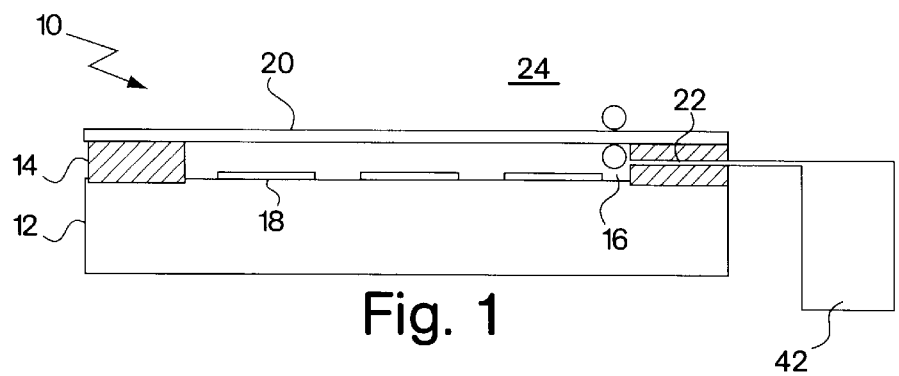
FIG. 1 is a side sectional view of a generic sensor in accordance with the teachings of this invention.

Referring to FIG. 1, a pressure profile sensor 10 in accordance with one embodiment of the present invention is shown. The pressure profile sensor 10 is formed of substrate 12, spacer 14, transducers 18, and membrane 20. For purposes of illustration only, and not to limit generality, the present invention will now be explained with reference to substrate 12 with a separate mounted spacer 14 and to membrane 20. One skilled in the art will appreciate, however, that embodiments of the present invention are not limited to separate structures for the spacer and substrate, but rather, a general mounting structure in accordance with embodiments of the present invention may be used. Furthermore, components other than membranes that displace in response to corresponding pressure differentials could replace the membrane, such as a lever or a rigid plate suspended on a bridge. A spring lever flexes in response to pressure differentials, similar to the action of a diving board. However, a lever alone does not seal the cavity/reference pressure source from contamination by the fluid to be measured, thus, the sensor must be encapsulated and testing shows that a lever with an outer sealing membrane reduces sensor sensitivity. A rigid plate suspended on a sensing bridge of piezoresisters is known in the prior art using semiconductor technology. However, a stainless steel plate must be approximately one millionth of an inch thick to achieve the sensitivity required for fluid pressure measurement, thus this method is currently difficult to fabricate in scales larger than semiconductor circuits and susceptible to damage during installation and cleaning.

Materials suitable for the substrate 12 and spacer 14 are known in the art and must be substantially incompressible in the direction of applied fluid pressure but may be flexible along other axes. This flexibility allows the sensor to be mounted on a curved surface, thus expanding the possible applications of the sensor. A variety of materials may be suitable for use in the substrate/sensor including a polyamide such as Kapton(TM). Where the mounting structure includes a separate substrate and spacer, they need not be of the same material, although in some applications this would be advantageous. In an embodiment for use in a rheometer, substrate 12 may for example be approximately 0.003 inches thick and spacer 14 is approximately 0.0035 inches thick. However, these dimensions can vary significantly with application. Spacer 14 can be formed from a layer of material with a cutout to define cavity 16 and an optional vent opening 22, and can be attached to substrate 12 using methods known in the art including a thermoset adhesive. In one embodiment shown in FIG. 2, an adhesive 30 with embedded, substantially incompressible beads 32 can be utilized either in addition to or instead of spacer 14. Since using adhesive 30 with embedded beads 32 maintains precise control of the cavity depth and even mounting of elastic membrane 20, this method can be used to replace spacer 14 if the diameter of the beads is sufficient, or it can be used to attach the membrane to the spacer. Preferably, the adhesive is quick set epoxy, the substantially incompressible beads are comprised of glass, and the ratio is approximately 8:1 epoxy to glass by weight. Small glass beads are known in the art and are currently sized between 10 microns to 10 millimeters diameter depending on the sensor application, epoxy thickness, and membrane thickness. However, the materials listed are given by way of illustration and may differ with application. During fabrication, cavity 16 and optional vent opening 22 can be masked to prevent overflow of beads 32 and adhesive 30.

Figure 2:
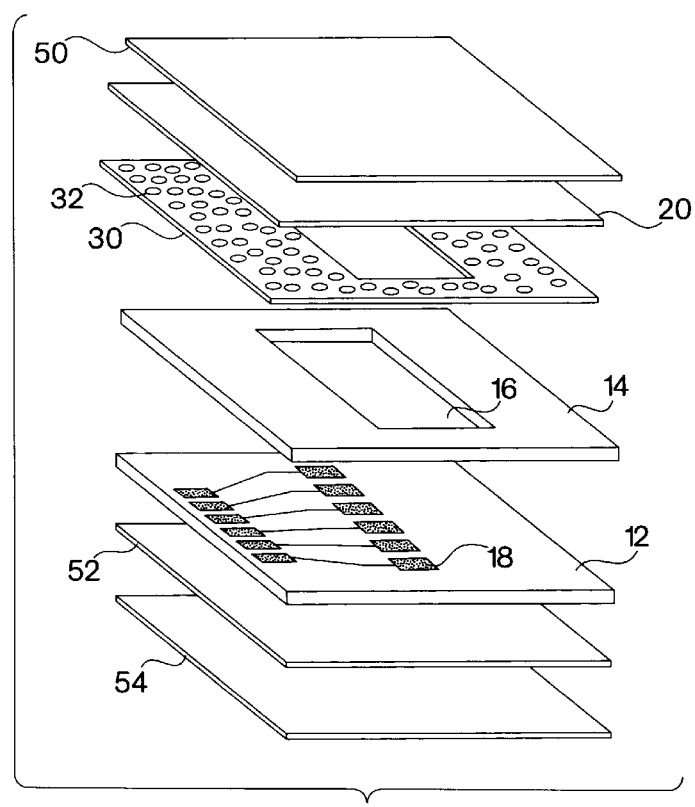
FIG. 2 is an exploded view of a sensor which may be utilized in practicing the teachings of this invention.

Referring to FIGS. 1 and 2, spacer 14 provides a substantially incompressible surround on which to mount sensing membrane 20 and creates cavity 16 between the substrate and the membrane. The cavity may be maintained at a predetermined reference pressure, for example ambient atmospheric pressure, a substantial vacuum, or higher than atmospheric pressure. Since membrane 20 separates cavity 16 from the material being measured, it deflects in response to the difference in pressure between the reference pressure and the fluid pressure of the material 24. If the reference pressure is less than the fluid pressure, then the membrane will deflect into the cavity. If the reference pressure is greater than the fluid pressure, then the membrane will deflect out of the cavity. The depth of cavity 16 is preferably sufficient to allow deflection of membrane 20 without contacting substrate 12 when sensor 10 is subjected to its maximum target pressure (i.e. the membrane is experiencing maximum curvature). Thus when membrane 20 deflects too far into cavity 16, it will touch substrate 12 and 'bottom out'. This can prevent permanent deformation of the membrane and avoid disturbing the flow of the fluid to be measured. Membrane 20 can be formed from a variety of elastic materials known in the art including biaxial, heat stabilized polyester, a polyamide such as Kapton(TM), or stainless steel. The material is preferably non-reactive with the fluid to be measured or can be coated with a non-reactive material including a thin plastic film such as Mylar(TM).

Figure 3:
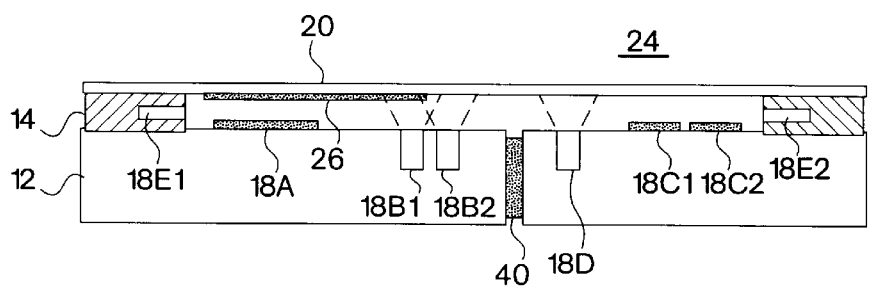
FIG. 3 is a side sectional view of a sensor in accordance with the teachings of this invention illustrating various types of transducers.

Referring to FIG. 3, non-contact transducers 18 are mounted in cavity 16, either on substrate 12 or alternatively to the spacer walls, to detect deflections at multiple regions on membrane 20. When the transducers are mounted to the spacer walls, some applications may not require a substrate, for example, a sensor to measure fluid flow in an enclosed volume where the sensor is mounted in an access hole of the enclosed fluid volume. In this example, the membrane is mounted such that the fluid is separated and sealed from the external environment through the access hole. The access hole forms the sensor cavity and the transducers can be mounted either on the walls of the access hole or on some attached mounting structure. If there is no substrate to seal the cavity hole, the reference pressure is the ambient atmospheric pressure.

Some embodiments may use only a single transducer, such as a scanning sensor 18D, to measure deflection at multiple areas on membrane 20 and convert such measurements to a pressure profile of fluid 24. Since a scanning sensor may be more expensive and difficult to maintain, a plurality of transducers within a single cavity is preferred.

To obtain the advantages of a pressure profile sensor, each transducer 18 should provide a substantially independent pressure measurement at each selected region on membrane 20. Sensing multiple areas on a single membrane can result in undesired coupled response between adjacent measurements, i.e., a transducer may respond to the pressure over adjacent areas as well as to the immediate local pressure. Transducer coupled response can be limited by providing sufficient spacing between membrane areas to be measured, through proper spacing, angling, or other control of transducers 18. In one embodiment, as shown in FIG. 2, the active area of membrane 20 is a linear rectangle (i.e. the shape of cavity 16). Using stress and strain equations known in the art, coupled response effects decrease to less than 10% of the possible maximum value when spacing between transducers exceeds 1.3 times the transducer width for a rectangular membrane. Thus, relatively small separations can effectively decouple adjacent transducers 18 within the same cavity 16. The appropriate spacing distance can be calculated for other membrane shapes (e.g., square, round, etc.). An alternative approach uses analytic or empirical deconvolution by mathematically separating out the coupled response due to neighboring deflections. Deconvolution methods may, however, be limited by the linear nature of the membrane response and by noise, particularly at high frequencies. Techniques such as Weiner filtering can be used to find the optimal analytic method. However, the currently preferred technique for achieving independent measurement is to provide sufficient spacing between adjacent transducers 18 by considering the sensitivity required, selecting an appropriate cavity width, and calculating the appropriate spacing for the selected cavity width. Since the spacing between adjacent transducers does not have to be uniform, the linear spacing shown in FIGS. 1, 2, and 3 are for the purposes of illustration only; one alternative is logarithmic spacing of transducers 18 such that there are denser measurements at the edges of membrane 20 than in the center, although a variety of transducer arrangements could be used. Transducers 18 should be mounted sufficiently far from the cavity sides to ensure proper deflection of membrane 20 and this spacing from the cavity sides is preferably uniform for all of the cavity sides. Referring to the embodiment of FIG. 2, it is seen that transducers 18 can be arranged in one linearly spaced row. One outline of cavity 16 is a linear rectangle as seen in FIG. 2; however, the cavity outline can be a variety of shapes including a circle as in FIG. 4 or a spiral as in FIG. 5. Multiple cavities can also be formed in the same mounting structure to create an array of sensors, for example multiple cavities formed as concentric circles as in FIG. 6. An array could also be achieved with a plurality of adjacent rectangular cavities or with other array architectures.

The sensitivity of pressure sensor 10 may be determined and controlled in a number of ways including preselecting the elasticity of the membrane material, mounting membrane 20 under a pre-tension, and/or controlling the membrane tension, and/or maintaining a particular reference pressure in cavity 16. Preferably, some amalgamation of these four methods will be used. Using a more elastic membrane material will make sensor 10 more responsive to slight differences in pressure of the fluid 24 being sensed, but the cavity depth will restrict the deflection range of membrane 20. In addition, the cavity width and tension of the membrane affect the ability of membrane 20 to respond to changes in fluid pressure, i.e., membrane deflection. Sensitivity of the sensor is proportional to the tension of the membrane, with higher tension extending the pressure range of the sensor, but reducing sensitivity. In fabrication, the tension can be selected by pre-stretching membrane 20 across a rigid flat platen (not shown) prior to mounting the membrane on spacer 14. Furthermore, the tension of the membrane can be actively controlled by a mechanism 40 to extend the active range of the membrane as shown in FIG. 3. The spacer 14 and substrate 12 may be split into two halves and devices, such as piezoelectric or magnetostricture devices, can be mounted between the two halves of substrate 12 and/or spacer 14 to actively control membrane tension. One half of the substrate may be attached to a backing plate and the other half slidable along the plate. As the fluid pressure increases and deflects membrane 20, the piezoelectric devices would expand and push the slidable portion of the substrate increasing the length of the substrate and pushing the separately mounted spacers apart to increase the membrane tension to resist further deflection. Since the membrane is essentially a stiff spring, an increase of the substrate length of a submicron will effect changes in membrane tension; for some applications, increases of over a micron will permanently deform the membrane.

Referring to FIG. 1, a reference pressure in cavity 16 can be maintained by sealing the cavity at a specific reference pressure or connecting the cavity to a reference pressure source 42 which may include an external pressure control device. Cavity 16 must always be separated and sealed from fluid 24 by membrane 20; this, for example, can be achieved by fluid resistant seals between membrane 20 and spacer 14 and between spacer 14 and substrate 12, or sensor 10 can be encapsulated with a plastic film, such as Mylar(TM), to create a fluid tight seal around the cavity. However, sealing cavity 16 from an external reference pressure source limits the sensor's operational temperature or altitude range if the reference pressure is greater than a substantial vacuum. Therefore to maintain a specific reference pressure in cavity 16 at a variety of temperatures and/or altitudes, the cavity can have a reference pressure opening, for example vent opening 22, connected to reference pressure source 42, which may be ambient atmospheric pressure or a controlled positive or negative pressure from a pressure control device/source known in the art.

In this type of sensor, actively controlling the sensitivity of sensor 10 allows the membrane to respond to low pressure differentials but also extends the active range of the membrane while avoiding over-deflection of the membrane. Transducers 18 may measure initial deflection of the membrane and the controller responds through a feedback mechanism by counteracting the deflection. Some examples, as discussed above, include the active tension control mechanism 40 and a pressure source 42 to control the reference pressure based on the pressure of fluid 24. An electrostatic force could also be used to inhibit membrane deflection and thus control the sensitivity. These examples dynamically expand and contract the sensor's pressure range based on the pressure range of fluid 24, thereby achieving optimal sensitivity while averting membrane overload. While the fluid pressure may be different at separate areas on the same membrane, the active tension control device 40 and the pressure source 42 control sensitivity of membrane 20 as a whole, based generally on the region of greatest membrane deflection corresponding to the greatest difference between the fluid pressure and the reference pressure. The outputs of the transducers and controller are calibrated and interpreted differently for various applications to determine pressure. A controller including electrostatic force could be combined with the transducer technology and, thus, in one embodiment would control each membrane detection area independently. In this type of sensor, the controller responds to the transducer measurements and a feedback device actuates the controller; if each membrane area is independently maintained in a static position, the pressure profile can be determined by the controller response.

Referring to FIG. 3, a pressure profile sensor in accordance with many embodiments of the present invention is shown. While for purposes of illustration only, various transducer types 18A–D are shown in FIG. 3; for a variety of reasons, including lessening manufacturing costs and simplifying control, transducers 18, all of one type, would normally be used. The transducers detect membrane deflection using technologies known in the art. A capacitor 18A measures capacitance electrically through a variety of ways including time to charge, time to discharge, or transmission impedance. One method of mounting capacitance traducers 18A in cavity 16 is to coat the inner surfaces of membrane 20 and substrate 12 with a conductive material 18A, 26; preferably approximately one ounce weight per square foot copper or aluminum is vacuum metallized to the membrane and substrate. Optionally, flexible silver ink may be coated on membrane 20. On the inner surface of the metallized substrate, sense plates and the printed wiring board for the capacitance transducers 18A may be etched in a variety of configurations. The inner surface 26 of the metallized membrane 20 may be etched with the drive traces or patterns to carry the excitation signal of the capacitor. The dielectric constant of the capacitor can be predetermined by using a fluid, preferably an inert gas such as Helium, to fill the cavity. Cavity 16 can be filled through vent opening 22 with different fluids for different operating temperature ranges. Vent openings are well known in the art, for example gauge measurement devices.

An additional type of transducer includes a radiation emitter and a radiation receiver, for example an optical transducer 18B including a light source 18B1 and a light detector 18B2 or an ultrasonic sensor 18C including an ultrasonic pulse emitter/detector 18C1, 18C2. One radiation emitter could in some applications be used to activate multiple radiation receivers. Radiation emitters and receivers can be mounted either on substrate 12 or on the sides of cavity 16 as shown for emitter/receiver 18E1, 18E2. Where a radiation emitter/receiver is utilized, mounted either on the substrate or spacer, the membrane material must be selected, coated, or otherwise processed to ensure that the radiation is reflected to the receiver. Furthermore, as is well known in the art, the emitter and receiver can be embodied in the same device. The optical sensor 18B can be of many types known in the art such as an optical lever or using a moire pattern, interferometry, or photoelasticity to detect deflection of the membrane. One example of ultrasonic sensors 18C known in the art includes acoustic resonance. Because of the reflection characteristics of radiation emitters and detectors, these types of transducers can be mounted on the cavity sides 18E1, 18E2.

FIG. 2 shows a shield 50 being mounted to the external surface of membrane 20 to protect the sensor from undesirable external influences including electrical, mechanical (e.g., scratches), and/or chemical disturbances. An optional shield 52 can also be mounted to the external surface of substrate 12. Some examples include using a conductive metal to create a ground plane to shield the internal electronics associated with transducers 18 or to coat the membrane with a thin plastic film, such as Mylar to protect the membrane from abrasive or reactive materials during operation, installation, and cleaning. This can be accomplished by vacuum depositing aluminum or copper to the membrane and/or substrate surfaces.

Figure 4:
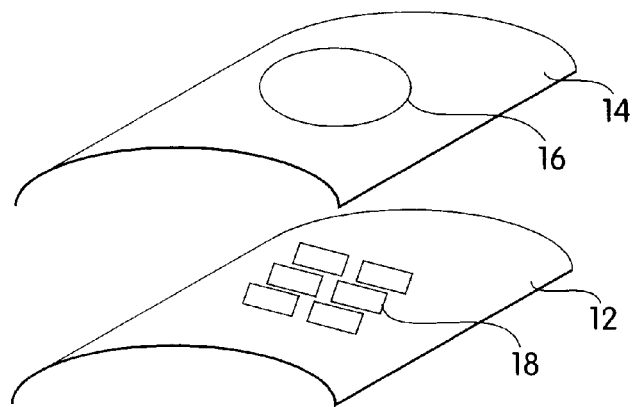
FIG. 4 is an exploded perspective view of a curved spacer and a curved substrate layer which may be utilized in practicing the teachings of this invention.
Figure 5:
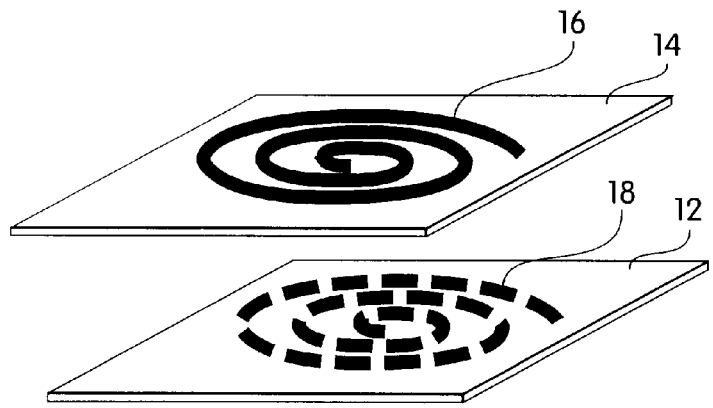
FIG. 5 is an exploded perspective view of a spacer layer in accordance with an alternative embodiment of this invention.

As discussed above, substrate 12 and spacer 14 can be flexible, thus allowing sensor 10 to be installed on surfaces of various curvatures as shown in FIG. 4. Since the operational curvature of sensor 10, i.e. installation configuration, affects the cavity depth, membrane tension, and choice of materials, the sensor can be mounted on a rigid backing plate 54 which is preformed to the target curvature. This method simplifies installation to ensure the sensor is flexed to the proper curvature to achieve the proper cavity depth, membrane tension, and internal reference pressure. A variety of adhesive methods, such as a pressure sensitive adhesive, can be used to mount the sensor on the backing plate.

Sensors 10 of this invention are scalable to sizes from sub-micron to kilometer scale. For some applications, a thin sensor structure may be required, less than 2 mm, to minimize disturbance of the fluid flow. For capacitive sensing in a thin sensor structure, a cavity depth of approximately 80 microns is preferred and the capacitors can detect deflections of a fraction of a micron. Optical transducers can detect deflections of a fraction of a nanometer. These values will differ depending on the application and are given by way of illustration.

Figure 6:
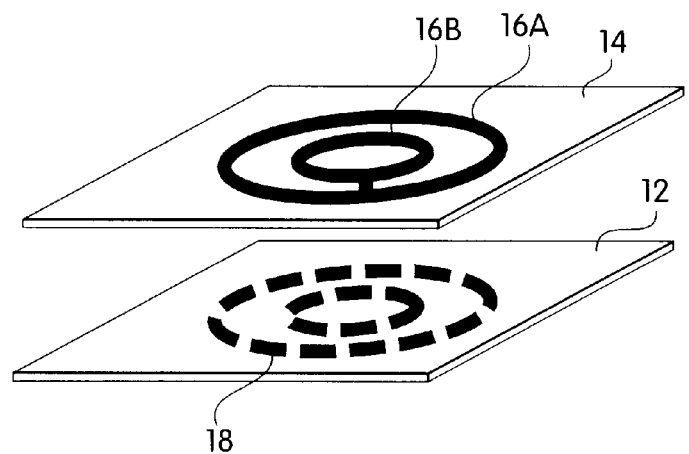
FIG. 6 is an exploded perspective view of a spacer and a substrate layer for still another embodiment of this invention.
Figure 7:
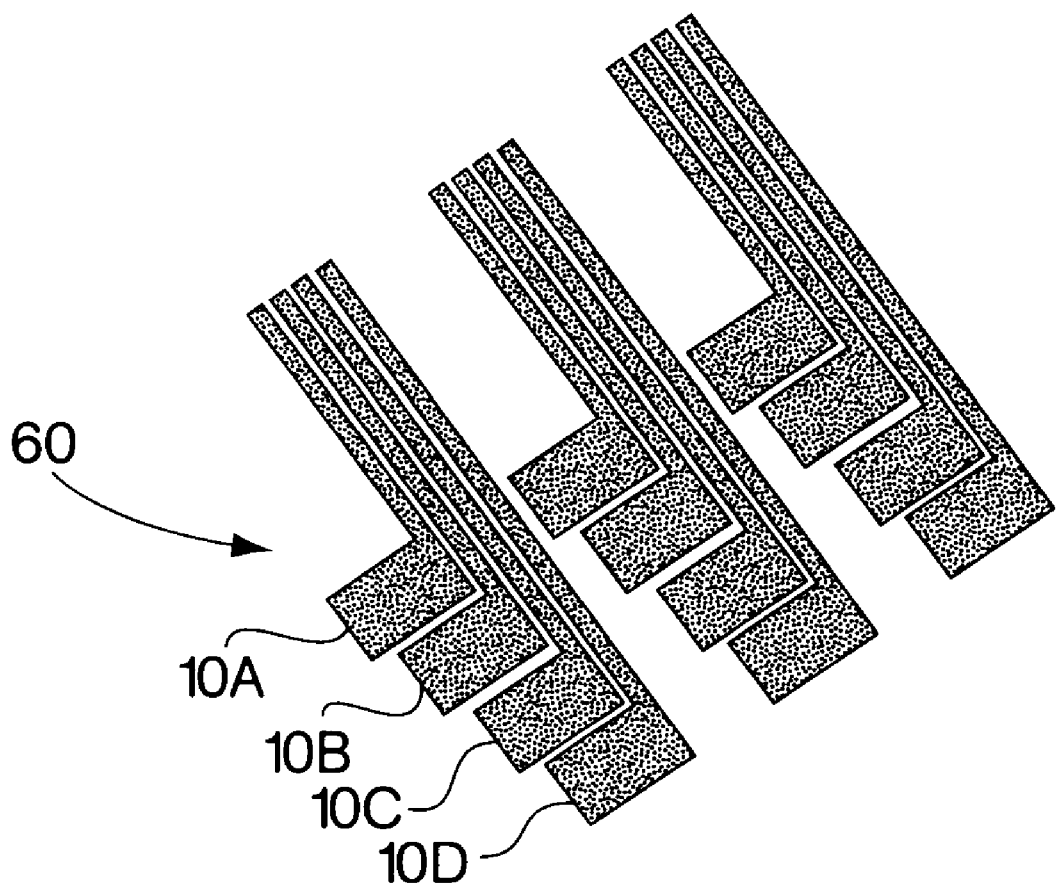
FIG. 7 is a top view of an array of sensors in accordance with the teachings of this invention.

A variety of pressure sensors 10 of the type described above may be placed adjacent to each other or other pressure sensors known in the art to expand the sensing area while achieving high resolution and sensitivity in selected areas. FIG. 7 shows one embodiment for an array 60 of sensors 10; however, the sensors can be mounted in various arrangements of which a matrix formation is only one example. Referring to FIG. 6, the outline of cavity 16 defines the active area of membrane 20; thus, multiple sensors can be formed by creating multiple cavities 16A, 16B in one mounting structure with a single membrane 20 covering each of the cavities. This method can simplify fabrication, installation, and cleaning since materials are conserved, sensor spacing is established during fabrication, and spacing between adjacent sensors is minimized. The cavities may have a fluid tight seal or may be connected to each other or to a reference pressure area with vent openings. One example of multiple sensors formed from multiple cavities in one structure is shown in FIG. 6 where two cavities form concentric circles and transducers 18 are in a single line within each circle. This embodiment may be useful in a rheometer application to substantially cover the rotating cone and provide an approximate average measurement. During fabrication, a cut out of two complete concentric circles will create three spacer parts; in one alternative, the cavities are arcs of circles such that all spacer areas remain connected.

While the invention has been particularly shown and described above with reference to preferred embodiments, the foregoing and other changes in form and detail may be made therein by one skilled in the art without departing from the spirit and scope of the invention.

What is claimed is:

1. A sensor apparatus, to detect the pressure of a fluid, comprising:

(a) a substantially incompressible mounting structure having a cavity formed therein;

(b) an elastic membrane, attached to said mounting structure and across said cavity, so as to separate said cavity from said fluid; and (c) at least one transducer mounted in said cavity, detecting deflection of said membrane at a selected plurality of regions thereon, facilitating the generating of a pressure profile across the membrane.

2. The sensor apparatus of claim 1, wherein there are a plurality of said transducers, each detecting deflection of at least one of said regions on said membrane.

3. The sensor apparatus of claim 2, wherein each of said transducers provides a substantially independent pressure measurement.

4. The sensor apparatus of claim 3, wherein said transducers are spaced sufficiently to minimize interaction therebetween.

5. The sensor apparatus of claim 1, wherein said membrane is constructed to deflect in directions both into and out of said cavity.

6. The sensor apparatus of claim 1, wherein said cavity formed in said mounting structure has a side wall, and wherein said transducers are arranged such that the spacing from a said cavity side wall to each region at which deflection is detected on said membrane is substantially uniform.

7. The sensor apparatus of claim 1, further including a mechanism for shielding the transducers.

8. The sensor apparatus of claim 7, further including a shield attached to an external side of said membrane.

9. The sensor apparatus of claim 7, further including a shield attached to an external side of the of said mounting structure.

10. The sensor apparatus of claim 1, wherein said mounting structure is formed from a material that is both flexible and substantially incompressible.

11. The sensor apparatus of claim 10, wherein said cavity is constructed to have a depth sufficient to allow deflection of said membrane into said cavity when the mounting structure is flexed.

12. The sensor apparatus of claim 1, wherein said mounting structure is comprised of a substantially incompressible substrate and a substantially incompressible spacer, the spacer being mounted on the substrate and having sides extending from the substrate which define said cavity.

13. The sensor apparatus of claim 12, wherein said transducers are mounted on the substrate.

14. The sensor apparatus of claim 12, wherein said transducers are mounted to the spacer.

15. The sensor apparatus of claim 12, wherein said membrane is attached to the substrate with an adhesive, and wherein the spacer is comprised of substantially incompressible beads embedded in the adhesive.

16. The sensor apparatus of claim 1, wherein said membrane is attached to the mounting structure with an adhesive having substantially incompressible beads embedded in the adhesive.

17. The sensor apparatus of claim 1, wherein said membrane is formed from a material of a preselected elasticity.

18. The sensor apparatus of claim 1, wherein said membrane is stretched across said cavity under a preselected tension.

19. The sensor apparatus of claim 1, wherein said cavity is constructed to maintain a predetermined reference pressure.

20. The sensor apparatus of claim 19, wherein said cavity includes a vent opening to a reference pressure.

21. The sensor apparatus of claim 20, further including a mechanism for controlling deflection of said membrane.

22. The sensor apparatus of claim 21, wherein the mechanism includes a mechanism for controlling the reference pressure.

23. The sensor apparatus of claim 21, wherein the mechanism controls deflection by adjusting the tension of said membrane.

24. The sensor apparatus of claim 1, wherein at least one of said transducers is a capacitor.

25. The sensor apparatus of claim 24, wherein said mounting structure includes a printed wiring board with connection traces and the at least one capacitor includes a sensing plate.

26. The sensor apparatus of claim 24, wherein said cavity is filled with a fluid to provide a predetermined dielectric constant.

27. The sensor apparatus of claim 1, wherein said transducers include at least one radiation emitter and at least one radiation receiver.

28. The sensor apparatus of claim 27, wherein the radiation emitter is a light source and the radiation receiver is an optical sensor.

29. The sensor apparatus of claim 27, wherein the radiation emitter is an ultrasonic pulse emitter and the radiation receiver is an ultrasonic pulse sensor.

30. A large area sensor system, to detect the pressure of a fluid, comprising at least two fluid pressure sensor apparatus, wherein at least one of the sensor apparatus is comprised of:

(a) a substantially incompressible mounting structure having a cavity formed therein;

(b) an elastic membrane, attached to said mounting structure and across said cavity, so as to separate said cavity from said fluid; and (c) at least one transducer mounted in said cavity, for detecting deflection of said membrane at a selected plurality of regions thereon, facilitating the generating of a pressure profile across the membrane.

31. A large area sensor system, to detect the pressure of a fluid, comprised of:

(a) a substantially incompressible mounting structure having a plurality of cavities formed therein;

(b) an elastic membrane, attached to said mounting structure and across said cavities, so as to separate said cavities from said fluid; and (c) at least one transducer mounted in each cavity, for detecting deflection at a selected plurality of regions of the membrane for each cavity, facilitating the generating of a pressure profile across the membrane.

32. The sensor system of claim 31, wherein at least two of the cavities are interconnected with a vent opening.

33. A fluid pressure sensor apparatus comprising:

at least one cavity;

a component extending over said at least one cavity which undergoes local displacement in response to corresponding local pressure differentials;

a plurality of displacement detectors in each said cavity, each of which converts a said local displacement to a signal; and a reference pressure applied on one side of said component; fluid pressure to be sensed being applied to the opposite side of the component.

34. The sensor apparatus of claim 33, wherein said displacement component displaces both toward and away from said applied reference pressure.

35. The sensor apparatus of claim 33, wherein each of said detectors provides a substantially independent measurement.

36. The sensor apparatus of claim 33, further including a means responsive to said detectors for controlling sensitivity of said sensor.

37. The sensor apparatus of claim 36, wherein the means for controlling sensitivity includes a mechanism for dynamically varying said reference pressure.

38. The sensor apparatus of claim 36, wherein said displacement component has a selected elasticity which is determined by said means for controlling sensitivity.

39. The sensor apparatus of claim 36, wherein the means for controlling sensitivity includes a means for dynamically controlling the tension of said displacement component.

40. The sensor apparatus of claim 33, wherein at least one of said detectors includes at least one means for emitting and at least one means for detecting a radiation signal.

41. The sensor apparatus of claim 33, wherein at least one of said detectors is a capacitor.

42. A sensor apparatus, to detect the pressure of a fluid, comprising:

(a) a substantially incompressible substrate;

(b) a substantially incompressible spacer mounted on said substrate and having sides extending from said substrate which define a cavity;

(c) an elastic, non-reactive membrane stretched across said cavity at a preselected tension, formed from a material of a preselected elasticity, attached to said spacer and arranged to separate said fluid from a predetermined reference pressure maintained in said cavity; and (d) a plurality of transducers mounted on said substrate in said cavity to measure displacement at selected regions of said membrane, each transducer providing a substantially independent pressure measurement.

43. A method for detecting the pressure of a fluid comprising the steps of:

(a) maintaining a reference pressure on one side of an elastic membrane extending over at least one cavity;

(b) exposing another side of said membrane to a fluid pressure to be detected; and (c) utilizing at least one transducer for each said cavity to measure the local displacement of the membrane over said cavity resulting from the pressure differential thereacross at a selected plurality of membrane regions, facilitating the generating of a pressure profile across the membrane.

44. The method for detecting of claim 43, further including the step of controlling deflection of the membrane in response to input from the transducer measurements.

45. A method for fabricating a pressure sensor comprising the steps of:

(a) providing a substantially incompressible mounting structure having a cavity formed therein;

(b) mounting a plurality of displacement transducers in said cavity; and (c) attaching a membrane across said cavity; said transducers being mounted to detect deflection at separate regions of said membrane, facilitating the generation of a pressure profile across the membrane.

46. The method of claim 45, further comprising the step of attaching a shield to the external side of said membrane.

47. The method of claim 45, further comprising the step of attaching a shield to the external side of said mounting structure.

48. The method of claim 45, wherein step (c) includes stretching said membrane to a preselected tension.

49. The method of claim 45, including a step (d) of creating a reference pressure in said cavity.

50. The method of claim 49, wherein step (d) includes forming a vent opening to said cavity.

51. The method of claim 45, wherein step (b) is performed by coating said mounting structure and said membrane with a conductive metal and etching sense pads and drive traces into the conductive metal.

52. The method of claim 45, wherein step (c) includes utilizing an adhesive having substantially incompressible beads mixed therein to attach said membrane to said mounting structure.

53. The method of claim 45, wherein step (a) includes the step of mounting a spacer on said mounting structure having sides extending from said mounting structure and forming a cavity therein.

54. The method of claim 53, wherein the step of mounting the spacer is performed by forming a spacer layer, removing a cutout from the spacer layer, and attaching the spacer layer to said substrate.

\* \* \* \* \*